United States Patent
Kamthe et al.

(10) Patent No.: US 11,968,083 B2
(45) Date of Patent: Apr. 23, 2024

(54) CONFIGURATION OF AN ACCESS POINT INCLUDING AN INTERNET-OF-THINGS (IOT) RADIO

(71) Applicant: HEWLETT PACKARD ENTERPRISE DEVELOPMENT LP, Houston, TX (US)

(72) Inventors: Ankur Kamthe, Santa Clara, CA (US); Berend Dunsbergen, San Jose, CA (US); Kairo Cesar Pinto Tavares, Porto Alegre (BR); Jian Dong, Santa Clara, CA (US); Bhushan Gopala Reddy, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 160 days.

(21) Appl. No.: 17/362,253

(22) Filed: Jun. 29, 2021

(65) Prior Publication Data
US 2022/0417088 A1    Dec. 29, 2022

(51) Int. Cl.
*H04L 41/0803*  (2022.01)
*H04W 24/02*  (2009.01)
*H04W 88/08*  (2009.01)

(52) U.S. Cl.
CPC ......... *H04L 41/0803* (2013.01); *H04W 24/02* (2013.01); *H04W 88/08* (2013.01)

(58) Field of Classification Search
None
See application file for complete search history.

(56) References Cited

U.S. PATENT DOCUMENTS

| 9,331,900 | B2 | 5/2016 | Chandra et al. |
| 10,708,126 | B2 | 7/2020 | Singal et al. |
| 2007/0115950 | A1* | 5/2007 | Karaoguz ............. H04W 88/08 370/356 |

(Continued)

OTHER PUBLICATIONS

Goodman, E. O. et al. "Wireless Access Point Configuration by Genetic Programming," Proceedings of the 2004 Congress on Evolutionary Computation (IEEE Cat. No. 04TH8753), Jun. 19, 2004, https://www.researchgate.net/publication/224751919_Wireless_access_point_configuration_by_genetic_programming/link/00b7d5242f6c0b6839000000/download.

(Continued)

*Primary Examiner* — Faruk Hamza
*Assistant Examiner* — Cassandra L Decker
(74) *Attorney, Agent, or Firm* — Hewlett Packard Enterprise Patent Department

(57) ABSTRACT

Examples described herein relate to configuration of access points including Internet-of-Things (IoT) radio. An access point identifier list is received from a network administration node in a network. Each access point identifier in the access point identifier list is uniquely associated with an access point, which includes an IoT radio. A first rules list is received from the network administration node. Each rule in the first rules list indicates a constraint and access point configuration values. An objective function is used to identify access point identifiers satisfying one or more of the constraints in the rules. The access points associated with the identified access point identifiers are configured with the access point configuration values as indicated in the rules.

20 Claims, 8 Drawing Sheets

(56) References Cited

U.S. PATENT DOCUMENTS

| | | | | |
|---|---|---|---|---|
| 2009/0141694 A1* | 6/2009 | Shi | ..................... | H04L 41/0806 |
| | | | | 370/338 |
| 2012/0252429 A1* | 10/2012 | Yoshizawa | ............ | H04W 24/02 |
| | | | | 455/418 |
| 2013/0272285 A1* | 10/2013 | Goldsmith | ............ | H04W 24/02 |
| | | | | 370/338 |
| 2017/0164417 A1* | 6/2017 | Kress | .................... | H04W 12/03 |
| 2018/0124688 A1* | 5/2018 | Thubert | ................ | H04W 24/02 |
| 2018/0324607 A1* | 11/2018 | Rengarajan | ............ | H04W 24/02 |
| 2019/0190782 A1* | 6/2019 | Panje | ..................... | H04L 67/34 |
| 2019/0200405 A1* | 6/2019 | Gupta | ................... | H04W 76/10 |
| 2020/0021670 A1* | 1/2020 | Agerstam | ............. | H04L 12/283 |
| 2022/0201475 A1* | 6/2022 | Koo | ...................... | H04W 12/06 |

OTHER PUBLICATIONS

Microsoft, "Tutorial: Implement a Device Firmware Update Process," Jun. 28, 2019, https://docs.microsoft.com/en-us/azure/iot-hub/tutorial-firmware-update.

Misra, S. et al., "DROPS: Dynamic Radio Protocol Selection for Energy-Constrained Wearable IoT Healthcare," IEEE Journal on Selected Areas in Communications, Aug. 31, 2020, vol. 39, Issue. 2, pp. 338-345, https://anandarupmukherjee.github.io/anandarup/pages/pdfs/ehealth/JSAC_DROPS.pdf.

* cited by examiner

400

402

RECEIVE AN ACCESS POINT IDENTIFIER LIST FROM A NETWORK ADMINISTRATION NODE IN A NETWORK, WHEREIN EACH ACCESS POINT IDENTIFIER IN THE ACCESS POINT IDENTIFIER LIST IS UNIQUELY ASSOCIATED WITH AN ACCESS POINT INCLUDING AN INTERNET-OF-THINGS (IOT) RADIO

404

RECEIVE A FIRST RULES LIST FROM THE NETWORK ADMINISTRATION NODE, WHEREIN A RULE IN THE FIRST RULES LIST INDICATES A CONSTRAINT AND ACCESS POINT CONFIGURATION VALUES

406

IDENTIFY AN ACCESS POINT IDENTIFIER SATISFYING THE CONSTRAINT INDICATED IN THE RULE USING AN OBJECTIVE FUNCTION

408

CONFIGURE THE ACCESS POINT ASSOCIATED WITH THE ACCESS POINT IDENTIFIER WITH THE ACCESS POINT CONFIGURATION VALUES INDICATED IN THE RULE

*FIG. 4* though several examples are described in this document, modifications, adaptations, and other implementations are possible. Accordingly, the following detailed description does not limit disclosed examples. Instead, the proper scope of the disclosed examples may be defined by the appended claims.

CONFIGURATION OF AN ACCESS POINT INCLUDING AN INTERNET-OF-THINGS (IOT) RADIO

BACKGROUND

To provide access to a network throughout a large area, such as a large building, organizations typically rely on the use of access points. Access points may be deployed at many locations over the area for which wireless network access is desired such that a client device within that area will be within range of one or more of the access points. An access point may provide a wireless interface to a wired network. A typical access point may have many configurable settings. The state of a setting may affect the way the access point functions and/or how other network devices, such as client devices, interface with the access point. For example, a given setting may define transmission power to be used while transmitting signals to client devices in the network. Other settings may specify a firmware and a protocol enabled by the firmware using which the access point may communicate with the client devices.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein:

FIG. 4 is a flow diagram depicting a method for configuring an access point including an IoT radio, in accordance with another example;

Figure 1:
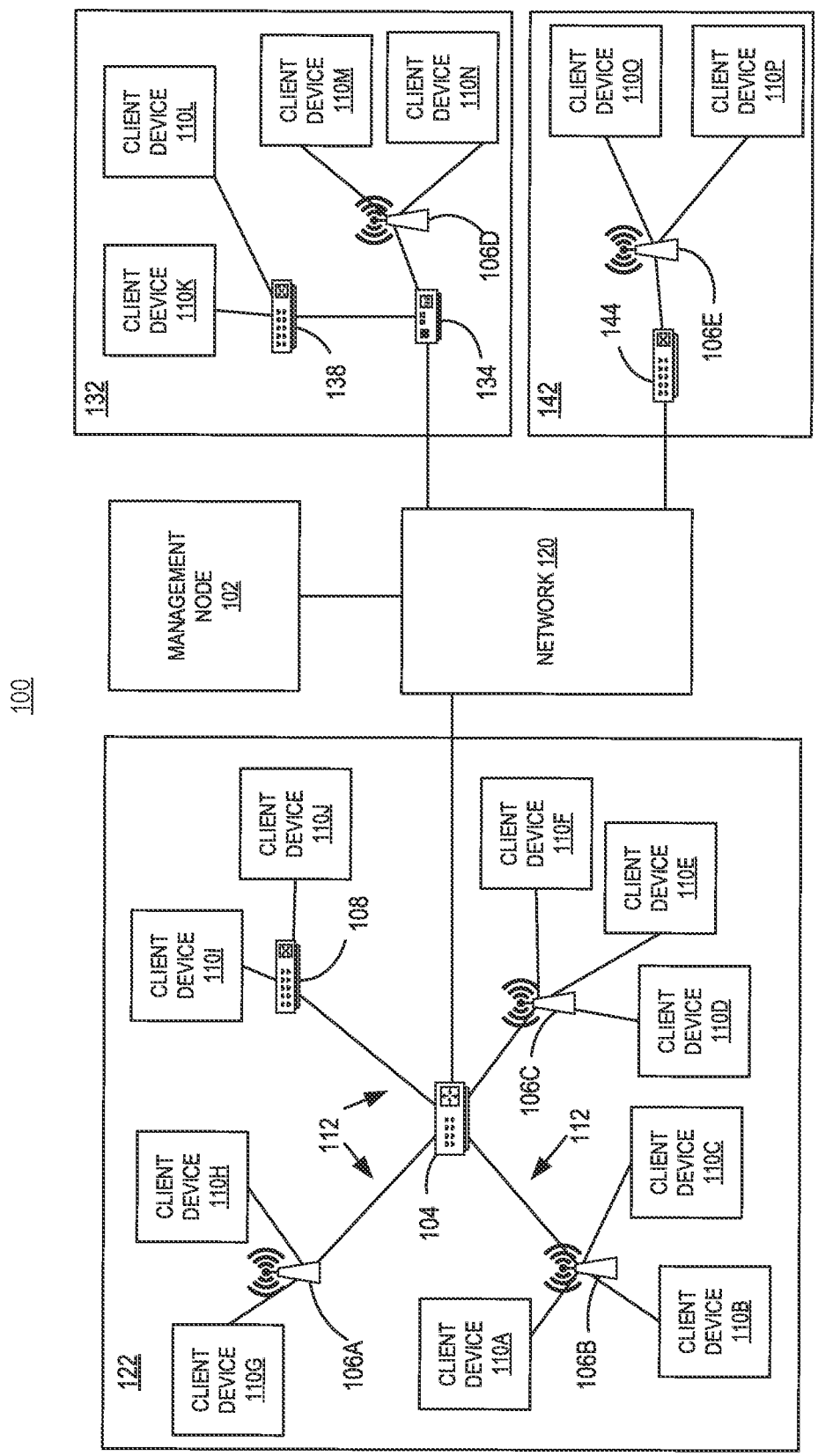
FIG. 1 depicts an example of a network system.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, same reference numbers are used in the drawings and the following description to refer to the same or similar parts. It is to be expressly understood that the drawings are for illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is to describe particular examples and is not intended to be limiting. As used herein, the singular forms "a," "an," and "the" are intended to include the plural forms as well, unless the context indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. Further, the term "and/or" as used herein refers to and encompasses any and all possible combinations of the associated listed items. It will also be understood that, although the terms first, second, third, fourth, etc., may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

An access point may include a radio component capable of sending and receiving data to and from wireless client devices in a network using radio signals. The radio component may include a combination of hardware and software and may be developed based on a technical standard (e.g., IEEE 802.11ax, IEEE 802.15.1, IEEE 802.15.4, etc.). Based on the standard, the radio component may support a protocol for communicating with a client device, which supports that protocol. A protocol may refer to a set of rules governing the type of data, commands, syntax, etc., to be used during communication between devices in a network. Some example protocols may include Wi-Fi protocols, Bluetooth protocols, Internet-of-Things (IoT) protocols, etc.

A radio component capable of supporting IoT protocols may be referred to as an "IoT radio". An access point with an IoT radio may support IoT protocols, such as Bluetooth Low Energy (BLE), Zigbee, Thread, etc. In some examples, IoT radios may be developed based on standards like wireless personal area network (WPAN) standards, such as IEEE 802.15.1 and IEEE 802.15.4 standards, allowing support for multiple IoT protocols. An IoT radio may support other protocols, such as Wireless Highway Addressable Remote Transducer Protocol (WirelessHART), ISA100.11a, IPv6 over Low-Power Wireless Personal Area Networks (6LoWPAN), Real-Time IoT (RIOT), TinyOS, Unison Real-Time Operating System (Unison RTOS), nanoQplus, Contiki, Zephyr, etc.

The access point and the IoT radio may include separate memory components capable of storing firmware. A firmware may refer to a specific set of instructions stored in a non-volatile memory that initializes functions of hardware and software components in a device. In an IoT radio, the firmware may support one or more protocols (e.g., IoT protocol), which allows the access point to interface with another device (e.g., IoT device). In an access point, the firmware may authenticate other software components, such as an access point image, stored in the non-volatile memory. The access point image may include a boot software, such as a bootloader, an operating system, and other machine-executable instructions for implementing a protocol, such as the IoT protocol. The bootloader may include instructions that are loaded into a main memory and may interface the hardware components and the operating system.

An access point may be capable of communicating with multiple IoT devices using different IoT protocols, which may be supported by a firmware stored in the memory components of the IoT radio and/or the access point. However, the memory component in the IoT radio and in the access points have a limited capacity. Due to the limited memory capacity, the firmware installed in the IoT radio may not be able to support multiple protocols. For example, the total memory space in the IoT radio may be less than 1 MB. The memory component may need to include the firmware for the protocol, a bootloader, and additional software components, such as Original Equipment Manufacturer (OEM) image, which may in aggregate require more than 1 MB of memory space. To overcome this limitation, multiple firmware may be bundled in the access point image in the memory component of the access point, where each firmware may support a different protocol. However, the memory component in the access point also has limited capacity, which limits the number of firmware that may be bundled in the access point image.

Some approaches to address the memory limitations may include manually reconfiguring the access point with a specific radio setting or configuration (e.g., protocols, firmware, transmission power) whenever required. However, the manual reconfiguration of each access point may be tedious and labor-intensive. For example, a network environment may include IoT devices operating and communicating using BLE or Zigbee protocol. In such a network, the access points may need to be reconfigured in certain scenarios. Example scenarios may include variation in the density of the different types of IoT devices in an area, low signal strength received at some access points, and/or installation of new IoT devices in a specific location. To change configurations of access points, a network administrator may have to manually assign configuration values for each access point individually. This task may become complicated when the number of protocols, firmware, and/or the IoT devices in the network increase. Additionally, some access points may also require a third-party firmware to support certain protocols, such as 6LoWPAN.

In some solutions, a central entity in the network may execute an application or microservice, which may manage the reconfiguration of the access points. The central entity may be a server, a controller, or a network device capable of managing a group of access points or individual access points. The central entity may periodically obtain network data and determine the configuration values for each access point. However, in a network including access points with IoT radio and IoT client devices, the central entity may not be able to obtain useful data for determining configuration values. For instance, some IoT devices, such as Zigbee-based devices, may be silent and may not provide data to the central entity automatically. Such devices may require manual interaction for pairing with a nearby access point, for example. In such scenarios, a central entity may not be able to perform automatic configuration of the access points.

To that end, the examples described herein address the above technical problems by providing automatic reconfiguration of access points including an Internet-of-Things (IoT) radio using a centralized entity. In some examples, an access point identifier list is received from a network administration node in a network. Each access point identifier in the access point identifier list is uniquely associated with an access point, which includes an IoT radio. A first rules list is received from the network administration node. Each rule in the first rules list indicates a constraint and access point configuration values. An objective function is used to identify access point identifiers satisfying one or more of the constraints in the rules. The access points associated with the identified access point identifiers are configured with the access point configuration values as indicated in the rules.

Accordingly, examples presented herein provide configuration of access points including IoT radio components using a centralized entity. The centralized entity leverages admin-defined rules to dynamically determine ideal combinations of access points and access point configuration values instead of individually configuring each access point. Further, the configuration process overcomes the memory limitations in IoT radios and reduces manual intervention for configuring the access points. Moreover, the examples described herein allow dynamic configuration of the access points as and when rules are received from a network administrator. Based on the configuration process, the radio capabilities of the access points may also be balanced to manage varying client device densities in a network.

Before describing examples of the disclosed methods and systems in detail, it is useful to describe an example network installation with which these systems and methods might be implemented in various applications. FIG. 1 illustrates one example of a network system 100 that may, for example, be implemented for an organization, such as a commercial space, healthcare facility, warehouse or storage facility, educational institution, governmental entity, or other organization. This diagram illustrates an example of a network implemented with an organization having multiple client devices 110 and multiple physical or geographical sites 122, 132, 142. The network system 100 may include a primary site 122 in communication with a network 120. The network system 100 may also include a secondary site 132, and tertiary site 142, which may be remote from the primary site and in communication with the network 120.

The primary site 122 may include a primary network, which can be, for example, a home network, an organizational network, or other network installation. In some examples, the primary site 122 network may be a private network, such as a network that may include security and access controls to restrict access to authorized users of the private network. Authorized users may include, for example, residents of a house, customers at a business, employees of a company at primary site 122, and so on.

Each site 122, 132, 142 may be in communication with a management node 102 for managing and configuring the network devices present in the sites. The management node 102 may be a central system, such as a computing system or a server, having compute, storage, and networking capabilities. The management node 102 may use such capabilities to receive network data, process the network data, and configure network devices. For example, the management node 102 may be operable to configure the access points 106A-C, such as at the primary site 122, and also at the secondary site 132 and tertiary site 142. The management node 102 may also manage the configuration of switches, routers, and/or client devices. The management node 102 and its capabilities will be further described in detail with respect to FIG. 2.

In the illustrated example, the primary site 122 includes a controller 104 in communication with the management node 102 through the network 120. The controller 104 may provide communication with the network 120 for the primary site 122, though it may not be the only point of communication with the network 120 for the primary site 122. In some examples, the controller 104 may be a hardware, software, or a combination thereof for orchestrating and centralizing the control of network devices like the access points 106A-C, client device 110A-J, etc. A single controller 104 is illustrated, though the primary site 122 may include multiple controllers and/or multiple communication points with network 120. In some examples, the controller 104 communicates with the network 120 using a router (not illustrated). In some examples, the controller 104 may itself be, or provide the functionality of, the access points 106A-C. In other examples, the controller 104 provides router functionality to the devices in the primary site 122. The controller 104 may be in communication with the access points 106A-C and/or one or more switches 108. Switches 108 and access points 106A-C provide network connectivity to various client devices 110A-J. Using a connection to a switch 108 or access points 106A-C, a client device 110A-J may access network resources, including other devices on the primary site 122 and other systems and devices connected to the network 120.

The client devices 110 may facilitate resources, for example, compute, storage, and/or networking resources, for one or more workloads, such as applications, to execute thereon. In various examples, the client devices 110 may be an Internet-of-Things (IoT) device including a processor or microcontroller, a memory component, a network component, and/or any other electronic component. The client devices 110 may have similar or varying hardware and/or software configurations in a given implementation of the network system 100. Examples of the client device 110 may include, but are not limited to, sensors, computing devices, IoT enabled devices, industrial IoT (IIoT) enabled devices, which may be included on a virtualized architecture and/or a non-virtualized architecture. As used herein, "IoT enabled devices" include devices embedded with electronics, software, sensors, actuators, and/or network connectivity which enable such devices to connect to a network and/or exchange data. As used herein, "IIoT" enabled devices refer to IoT enabled devices that are used in industrial applications, such as manufacturing or energy management for example. Examples of IoT-enabled devices include sensors, vehicles, monitoring devices, devices enabling intelligent shopping systems, manufacturing devices, and the like.

In addition to the IoT devices, the client devices 110 may also include electronics devices or systems, such as a computer appliance, a workstation, a desktop computer, a laptop computer, a smartphone, a smart wearable device, a head-mounted display device, mainframes, tablet computers, e-readers, netbook computers, televisions and similar monitors (e.g., smart TVs), content receivers, set-top boxes, personal digital assistants (PDAs), smart terminals, dumb terminals, a server, virtual terminals, video game consoles, virtual assistants, and the like.

Further, within the primary site 122, a switch 108 is included as one example of a point of access to the network established in primary site 122 for wired client devices 110I-J. Client devices 110I-J may connect to the switch 108 and through the switch 108, may be able to access other devices within the network system 100. The client devices 110I-J may also be able to access the network 120, through the switch 108. The client devices 110I-J may communicate with the switch 108 over a wired connection 112. In the illustrated example, the switch 108 communicates with the controller 104 over a wired connection 112, though this connection may also be wireless.

The access points 106A-C provide a point of access to the network established in primary site 122 for client devices 110A-H. The access points 106A-C may control network access of the client devices 110A-H and may authenticate the client devices 110A-H for connecting to the access points and through the access points, to other devices within the network system 100. Each of access points 106A-C may be a combination of hardware, software, and/or firmware that is configured to provide wireless network connectivity to wireless client devices 110A-H. In some examples, access points 106A-C may be configured and managed by the management node 102. In other examples, the access points 106A-C may be managed and configured by the controller 104. Access points 106A-C communicate with the controller 104 and the network over connections 112, which may be either wired or wireless interfaces. The access points 106A-C may include radio components for communicating with the client devices 110A-H using radio signals. In some examples, the radio components may be an IoT radio component capable of communicating with IoT client devices using IoT protocols. In some examples, the radio components may also include a Wi-Fi radio component, a Bluetooth radio component, and the like.

The network system 100 may include one or more secondary sites 132. The secondary site 132 may be located at a different physical or geographical location from the primary site 122. In some cases, the secondary site 132 may be in the same geographical location, or possibly the same building, as the primary site 122, but lacks a direct connection to the network located within the primary site 122. Instead, secondary site 132 may utilize a connection over a different network, e.g., network 120. The secondary site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The secondary site 132 may also include a switch 138 and/or access point 106D in communication with the gateway device 134 over either wired or wireless connections. The switch 138 and access point 106D may provide connectivity to the network for various client devices 110K-N.

In various examples, the secondary site 132 may be in direct communication with primary site 122, such that client devices 110K-N at the secondary site 132 access the network resources at the primary site 122 as if these clients devices 110O-P were located at the primary site 122. In such examples, the secondary site 132 may be managed by the controller 104 at the primary site 122, and the controller 104 may provide the necessary connectivity, security, and accessibility that enable the secondary site 132's communication with the primary site 122. Once connected to the primary site 122, the secondary site 132 may function as a part of a private network provided by the primary site 122.

In various examples, the network system 100 may include one or more smaller tertiary sites 142, comprising only a gateway device 144 for communicating with the network 120 and a wireless access point 106E, by which various client devices 110O-P access the network 120. Such a tertiary site 142 may represent, for example, an individual employee's home or a temporary remote office. The tertiary site 142 may also be in communication with the primary site 122, such that the client devices 110O-P at the tertiary site 142 access network resources at the primary site 122 as if these client devices 110O-P were located at the primary site 122. Once connected to the primary site 122, the tertiary site 142 may function as a part of a private network provided by the primary site 122.

The network 120 may be a public or private network, such as the Internet, or other communication network to allow connectivity among the various sites 122, 132 to 142. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network system 100 but that facilitate communication between the various parts of the network system 100, and between the network system 100 and other network-connected entities.

Figure 2:
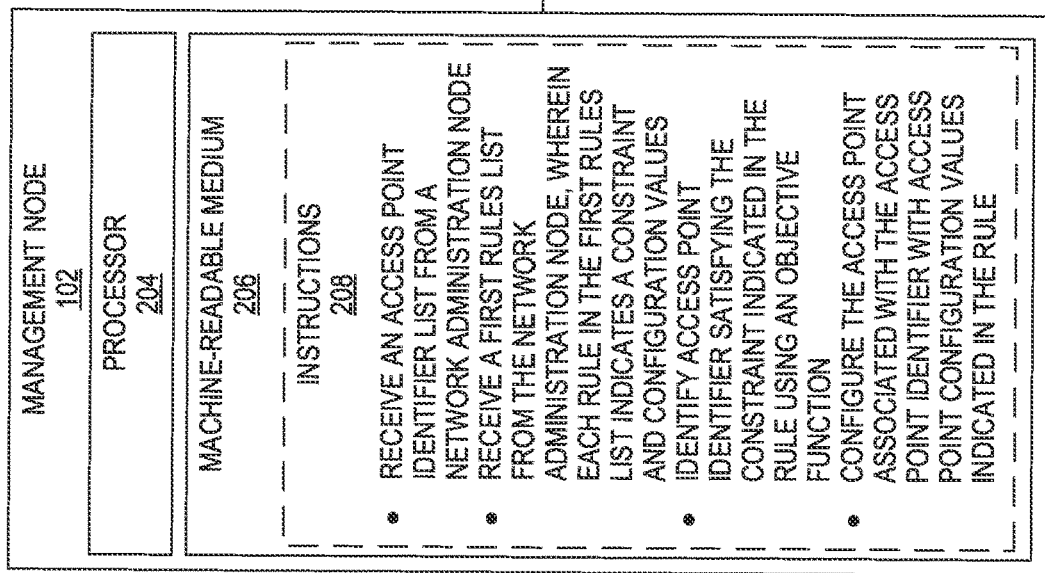
FIG. 2 depicts an example of a network system for configuring an access point including an Internet-of-Things (IoT) radio.

FIG. 2 depicts a network system 200 including the management node 102, a network administration node 202, and the access points 106A-C, in accordance with an example. The access points 106A-C may be part of the network site 122 as described with reference to FIG. 1, for example. The management node 202 may be coupled to the network site 122 over the network 120 as part of the network system 200. The network system 200 may facilitate configuration of the access points 106A-C including IoT radio components 108A-C, respectively. In FIG. 2, although the network system 200 is shown to include one management node 102, one network administration node 202, and three access points 106A-C, the network system 200 may include any number of management nodes, network administration nodes, and access points, without limiting the scope of the present disclosure.

Examples of the network 120 may be public or private networks including, but not limited to, an Internet Protocol (IP) or non-IP-based local area network (LAN), wireless LAN (WLAN), metropolitan area network (MAN), wide area network (WAN), a storage area network (SAN), a personal area network (PAN), a cellular communication network, and the Internet. Communication over the network 120 may be performed in accordance with various communication protocols such as, but not limited to, Transmission Control Protocol and Internet Protocol (TCP/IP), User Datagram Protocol (UDP), IEEE 802.11, and/or cellular communication protocols. The communication over the network 120 may be enabled via a wired (e.g., copper, optical communication, etc.) or wireless communication technologies. In some examples, the network 120 may be enabled via private communication links including, but not limited to, communication links established via wireless, wired (e.g., copper), and the like.

The access points 106A-C may be the same or similar access points described with reference to FIG. 1. The access points 106A-C may perform network data transmission operations including, but not limited to, switching, routing, bridging, or a combination thereof. The access points 106A-C may also perform network interface operations that may allow wireless network devices, such as client devices 110A-P illustrated in FIG. 1, to connect to a wired or wireless network via various communications standards. The access points 106A-C may include any necessary hardware components including, but not limited to, processing units, memory units, input devices, communications equipment, etc. The access points 106A-C may include one or more network interfaces. A network interface may include a network interface controller (NIC) having one or more ports (e.g., Ethernet ports), one or more sockets, one or more adapters, or a combination thereof. The access point is not intended to be limited to wireless access points which conform to IEEE 802.11 standards.

In addition, the access point 106A-C may include a radio component having a specific Media Access Control (MAC) address. In some examples, the radio component may be an IoT radio. In some examples, the radio component may operate at a 5 GHz band which conforms to the IEEE 802.11ac standard, a 2.4 GHz band which conforms to one or more of the IEEE 802.11ac, 802.11n, and 802.11g standards, or a combination thereof. In some examples, the radio component 108A-C may operate at one or more frequency bands. It will be understood by one skilled in the art that a radio of a network interface may transmit and receive wireless signals that conform to any suitable type(s) of wireless communications standard(s), now known or later developed, and/or operate at any suitable frequency range(s).

The network administration node 202 may include at least one processor and at least one machine-readable storage medium encoded with instructions that are executable by the at least one processor to manage the functionalities of the network site 122. The network administration node 202 may monitor and orchestrate the functions of the access points and other devices (e.g. client device 110A-P, switch 108 illustrated in FIG. 1) in the site 122. For instance, the network administration node 202 may obtain settings associated with the access points 106A-C in the network site 122. In some examples, the access point settings may include radio configurations including but not limited to, firmware type, protocols, power specification, and the like. In some examples, the network administration node 202 may receive access point identifiers 210, 212, 214 (labeled as AP_ID1, AP_ID2, AP_ID3) from the access points 106A-C, respectively. The access point identifier may include access point context, which may specify a type and a location of an access point in the network site 122. The type of access point may indicate a type of access point design (e.g., internal antenna or external antenna) or a type based on operating environment (e.g., indoor access point or outdoor access point), for example. The location of the access point may indicate the location with respect to a site (e.g., floor number and building name in a site), for example.

In addition, the network administration node 202 may engage in any network data transmission operations, including, but not limited to, switching, routing, bridging, or a combination thereof. In some examples, the functions of the network administration node 202 may be implemented in the management node 102. Alternatively, the network administration node 202 may be a computing system communicatively coupled with the management node 102 over the network 120. In some examples, the functions performed by the network administration node 102 may be automated using various machine learning techniques. In other examples, the network administration node 202 may be manually operated by a network administrator or operator. Further, in some examples, the network administration node 202 may include a dashboard interface (not shown in FIG. 2) to display a summary of the settings and context of the access points 106A-C and other network devices.

As depicted in FIG. 2, in some examples, the management node 102 may be a system including a processor or microcontroller and/or any other electronic component, or a device that may facilitate various compute and/or data storage services, for example. Examples of the management node 102 may include, but are not limited to, a server, a computer appliance, a desktop computer, a laptop, a smartphone, a workstation, a storage system, or a converged or hyperconverged system, and the like that is configured to manage and configure network devices. Further, in certain examples, the management node 102 may be or may include a virtual machine or a containerized application executing on hardware in the network system 200.

In some examples, the management node 102 may include a processor 204 and a machine-readable medium 206. The machine-readable medium 206 may be any electronic, magnetic, optical, or other physical storage device that may store data and/or executable instructions 208. For example, the machine-readable medium 206 may include one or more of a Random Access Memory (RAM), an Electrically Erasable Programmable Read-Only Memory (EEPROM), a storage drive, a flash memory, a Compact Disc Read-Only Memory (CD-ROM), and the like. The machine-readable medium 206 may be non-transitory. As described in detail herein, the machine-readable medium 206 may be encoded with the executable instructions 208 to perform one or more methods, for example, methods described in FIGS. 4, 5, 6A, and 6B.

Further, the processor 204 may be a physical device, for example, one or more central processing unit (CPU), one or more semiconductor-based microprocessors, one or more graphics processing unit (GPU), application-specific integrated circuit (ASIC), a field-programmable gate array (FPGA), other hardware devices capable of retrieving and executing instructions 208 stored in the machine-readable medium 206, or combinations thereof. The processor 204 may fetch, decode, and execute the instructions 208 stored in the machine-readable medium 206 to configure access points 106A-C including IoT radios 108A-C (described further below). As an alternative or in addition to executing the instructions 208, the processor 204 may include at least one integrated circuit (IC), control logic, electronic circuits, or combinations thereof that include a number of electronic components for performing the functionalities intended to be performed by the management node 102 (described further below). Moreover, in certain examples, where the management node 102 may be a virtual machine or a containerized application, the processor 204 and the machine-readable medium 206 may represent a processor and a machine-readable medium of the hardware or a computing system that hosts the management node 102 as the virtual machine or the containerized application.

During operation, the processor 204 may receive an access point identifier list 216 (labeled as AP_ID_LIST) from the network administration node 202 in the network 122. The access point identifier list 216 may specify access point identifiers 210, 212, 214 associated with the access points 106A-C including IoT radios 108A-C, respectively. In other examples, the processor 204 may directly receive the access point identifiers 210, 212, 214 from the access points 106A-C. The processor 204 may receive a first rules list 218 (labeled as RUL_LIST) from the network administration node 202. The first rules list 218 may include one or more rules for configuring access points 106A-C in the network site 122.

Figure 3C:
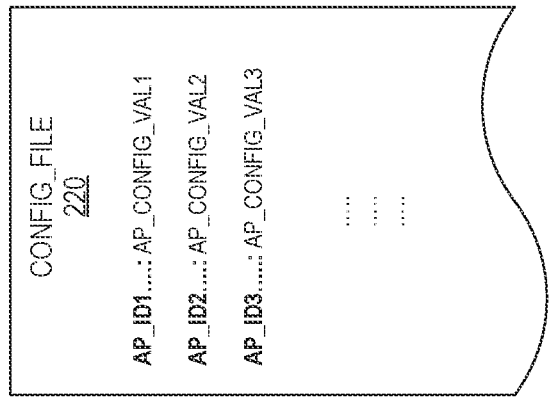
FIGS. 3A, 3B, and 3C depict an access point identifier list, a rules list, and a configuration file, respectively, in accordance with an example.
Figure 3B:
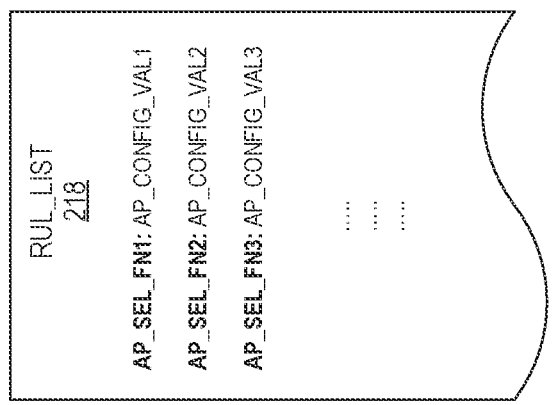
Figure 3A:
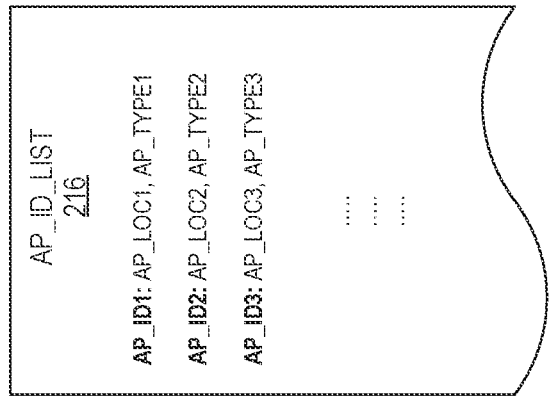

FIGS. 3A and 3B depict the access point identifier list file and the rules list file, in accordance with an example. The access point identifier list 216 and the rules list 218 may be transmitted in a key-value pair file format, such as a Javascript Object Notation (JSON) file or Extensible Markup Language (XML) file format. In the access point identifier list 216, each access point identifier may be a key and the access point location (labeled as AP_LOC1, AP_LOC2, AP_LOC3) and access point type (AP_TYPE1, AP_TYPE2, AP_TYPE3) may be the values for the respective key. The access point location may indicate the location of the access point with respect to a site (e.g., floor number and building name in a site). For example, the AP_LOC1 may be 'Floor 1', AP_LOC2 may be 'Floor 2', AP_LOC3 may be 'Floor 3' of a building in a site (e.g., Site 122). The access point type may indicate type of access point design (e.g., internal antenna or external antenna) or access point type based on operating environment (e.g., indoor access point or outdoor access point). For example, AP_TYPE1 may be 'external antenna AP', AP_TYPE2 may be 'internal antenna AP', and AP_TYPE3 may be 'internal antenna AP'.

In the rules list 218, each rule may indicate a constraint and access point configuration values. In some examples, the constraint may include an access point selection function for selecting one or more access point identifiers. The access point selection function may include one or more criteria, such as a location or type of access point, for selecting an access point or multiple access points, for example. In some examples, the access point configuration values may include firmware, protocol, power specification, and the like. The firmware may include Original Equipment Manufacturer (OEM) supported firmware or a third-party firmware. Examples of the protocol may include Bluetooth Low Energy (BLE), Zigbee, Thread, Wireless Highway Addressable Remote Transducer Protocol (WirelessHART), ISA100.11a, IPv6 over Low-Power Wireless Personal Area Networks (6LoWPAN), Real-Time IoT (RIOT), TinyOS, Unison Real-Time Operating System (Unison RTOS), nanoQplus, Contiki, Zephyr, etc. The power specification may include a magnitude of transmission power to be used during communication. Each rule may be framed in a key-value pair format, where the constraint (labeled as AP_SEL_FN1, AP_SEL_FN2, AP_SEL_FN3) may be the key and the configuration values (labeled as AP_CONFIG_VAL1, AP_CONFIG_VAL2, AP_CONFIG_VAL3) may be the values.

Referring back to FIG. 2, the processor 204 may identify access point identifiers from the access point identifiers list 216 based on the rules included in the first rules list 218. In some examples, the processor 204 may identify access point identifiers, which satisfy one or more of the constraints indicated in the rules. In some examples, the identification of the access point identifiers may be performed using an objective function. The objective function may be a mathematical function for determining a value (hereinafter referred to as objective function value) for a given input. For instance, an access point identifier and the rules list may be provided as input to the objective function and the objective function value may be the output. In some examples, the objective function value may indicate whether a given access point identifier satisfies a constraint in a rule in the first rules list 218. The access point identifier may satisfy a constraint in instances where the access point location (e.g., AP_LOC1) or type (e.g., AP_TYPE1) matches the location or type specified in the constraint, for example.

In some examples, the processor 204 may execute an optimization algorithm to vary the input (e.g., the access point identifier) for determining an optimum objective function value. For example, the processor 204 may use the optimization algorithm to iteratively select different access point identifiers as input to the objective function to determine whether the optimum objective function value is obtained for that access point identifier. The optimum objective function value may be a predefined maximum or minimum value of the objective function. For example, the predefined maximum or minimum objective function value may indicate that the given access point identifier satisfies one of the rules in the first rules list 218.

In other examples, the processor 204 may identify access point identifiers based on a combination of access point identifiers and access point configuration values that satisfy a rule in the rules list (as will be described further in relation to FIG. 5). In such examples, the processor 204 may provide a combination of access point identifiers, access point configuration values, and the rules list as inputs to the objective function to obtain objective function values.

Based on the objective function value for each access point identifier, the processor 204 may obtain a list of access point identifiers for configuration that satisfy the constraints in the rules. The processor 204 may configure the access points 106A-C associated with the one or more access point identifiers with the access point configuration values indicated in the rule. For instance, the processor 204 may send a configuration file 220 (labeled as CONFIG_FILE as depicted in FIG. 3C) to a network administration node 202. In other examples, the processor 204 may send the configuration file 220 directly to the access points 106A-C. The configuration file may be a key-value pair file including access point identifiers and access point configuration values as keys and values, respectively. The access points are configured with the access point configuration values as indicated in the configuration file 220.

Moving now to FIG. 4, a flow diagram depicting a method 400 for configuring access points including IoT radios is presented, in accordance with an example. For illustration purposes, the method 400 is described in conjunction with the network system 200 of FIG. 2, but the method 400 should not be construed to be limited to the example configuration of system 200. The method 400 may include method blocks 402, 404, 406, and 408 (hereinafter collectively referred to as blocks 402-408) which may be performed by a system such as, for example, the management node 102. In particular, operations at each of the method blocks 402-408 may be performed by the processor 204 by executing the instructions 208 stored in the machine-readable medium 206 (see FIG. 2). In some other examples, the order of execution of the blocks 402-408 may be different than the order shown in FIG. 4. For example, the blocks 402-408 may be performed in series, in parallel, or a series-parallel combination. Also, certain details of the operations performed by the processor 204 that are already described in FIG. 2 are not repeated herein for the sake of brevity.

At block 402, the processor 204 may receive an access point identifier list 216 from a network administration node 202 in a network. Each access point identifier in the access point identifier list 216 is uniquely associated with an access point including an IoT radio. The access point identifier may indicate an access point location and/or access point type. For example, format of an access point identifier indicating access point location may be: {Site}-{Building}-{Floor}-{Quadrant}-{Extra Modifier}. Such an access point identifier indicates the location of the access point in terms of the location site (e.g., 122, 132, 142 in FIG. 1), the name of the building in the site, the floor number in the building, quadrant (e.g., east, west, north, south) of the floor, and an additional variable indicated under "Extra Modifier".

At block 404, the processor 204 may receive a first rules list 218 from the network administration node 202. Each rule in the first rules list indicates a constraint and access point configuration values. In some examples, each rule may also include a penalty value. The penalty value may be used for changing the objective function value in instances where the access point identifier fails to satisfy a constraint in a rule (as will be described further in relation to FIG. 6A). In some examples, the rules may be framed and provided by a network administrator operating the network administration node 202. As described with reference to FIG. 3B, the rules may be in a key-value pair format. In some examples, the network administration node 202 may create a key value-pair format using the inputs provided by the network administrator. For instance, the network administrator may provide the constraints and access point configuration values as input in a predefined syntax. An example rule based on the predefined syntax may be: "SELECT [AP_SEL_FUN] {IOT_RADIO_FW} {IOT_RADIO_PARAM} {PENALTY}". In such a rule, the constraint may be the access point selection function indicated as "AP_SEL_FUN". The access point configuration values may be the firmware type (indicated as IOT_RADIO_FW), and the protocols and power specification (indicated as IOT_RADIO_PARAM). The penalty value may be a numeric value (indicated as "PENALTY"). Some examples of the rules in the rules list may be as depicted in Table 1.

TABLE 1

Example rules based on a predefined syntax

| Rule | Rule Syntax |
|---|---|
| First rule | SELECT [#if access point name's {Extra Modifier} matches with "Elevator"] {iot_radio_firmware=default} {iot_radio_mode=zigbee} {penalty=-20} |
| Second rule | SELECT [#if access point name's {Floor} is greater than 1 and less than 5] {iot_radio_firmware=default} {iot_radio_mode=BLE} {penalty=-10} |
| Third rule | SELECT [#if access point name's {Building} matches "Warehouse"] {iot_radio_firmware=third-party} {iot_radio_mode=ISA} {penalty=-90} |

The first rule (in Table 1) specifies that the radio mode should be set to Zigbee for all IoT radios on access points with the names having "Elevator" in it. The constraint, i.e., the access point selection function is [# if access point name's {Extra Modifier} matches with "Elevator"], which indicates that access point identifiers specifying "Elevator" must be selected.

The second rule (in Table 1) specifies that the radio mode should be set to BLE for all IoT radios on access points with names having Floor values greater than 1 and less than 5. The constraint, i.e., the access point selection function is [# if access point name's {Floor} is greater than 1 and less than 5], which indicates that access points located from first floor to fifth floor are selected.

The third rule (in Table 1) specifies that the radio should be reprogrammed to the third party firmware to enable support for the ISA100 protocol for all IoT radios on access points with names where the building substring matches "Warehouse". The constraint, i.e., the access point selection function is [# if access point name's {Building} is 'Warehouse'], which indicates that access points located in Warehouse building are selected.

Table 2 depicts the constraints (access point selection function) and access point configuration values in a key-value format. The key-value pairs may be specified in a configuration file 220, for example.

TABLE 2

Constraint and configuration values in key-value pairs

| Rule | {Key:Value} |
|---|---|
| First rule | {[if access point name's {Extra Modifier} matches with "Elevator"]: "iot_radio_firmware=default", "iot_radio_mode=zigbee"} |
| Second rule | {[#if access point name's {Floor} is greater than 1 and less than 5]: "iot_radio_firmware=default", "iot_radio_mode=BLE"}. |
| Third rule | {[#if access point name's {Building} is 'Warehouse']: "iot_radio_firmware=other", "iot_radio_mode=ISA"}. |

At block 406, the processor 204 may identify an access point identifier satisfying the constraint indicated in the rule using an objective function. In some examples, the processor may identify a set of access point identifiers satisfying one or more constraints indicated in the rules using the objective function. The identification of access point identifiers and the selection of access points based on the identification is further described with respect to FIGS. 5, 6A, and 6B.

At block 408, the processor 204 may configure the access points associated with the access point identifier with the access point configuration values indicated in the rule. In some examples, the configuring the access points may include assigning the access point configuration values to the access point based on the rule. A configuration file may be sent to the access point based on the assignment. In some examples, the configuration file may include instructions for configuring the access point configuration values.

In some examples, the processor 204 may receive a second rules list from the network administration node in the network. Each rule in the second rules list includes constraint and access point configuration values. The processor 204 may identify an access point identifier satisfying the constraint indicated in the rule in the second rules list using the objective function. The processor 204 may dynamically configure the access point with the access point configuration values indicated in the rule in the second rules list.

Figure 5:
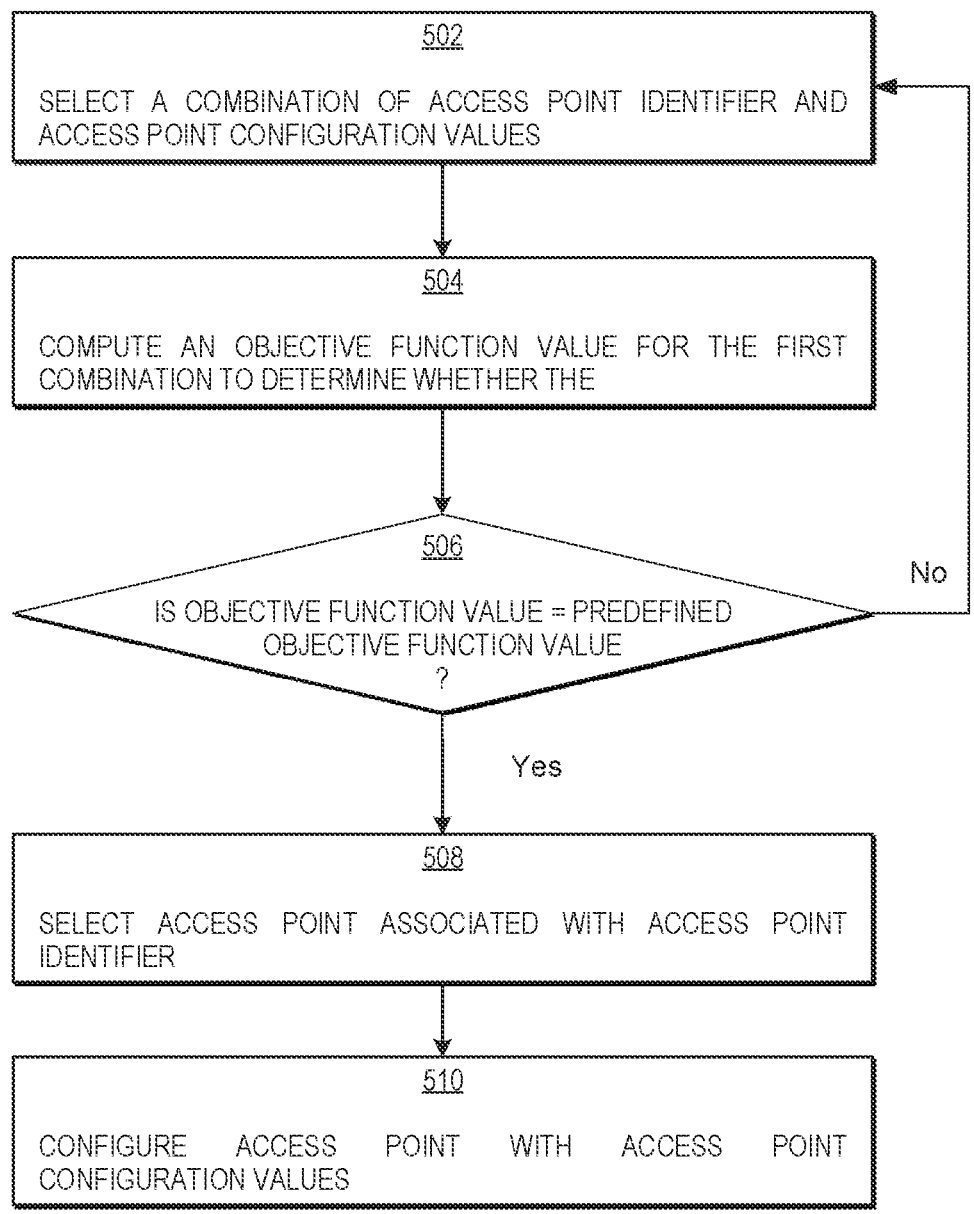
FIG. 5 is a flow diagram depicting a method for selecting an access point for configuration, in accordance with an example.

FIG. 5 is a flow diagram depicting a method 500 for selecting access points for configuration, in accordance with an example. At block 502, the processor 204 may select a first combination of access point identifier and access point configuration values. For example, the first combination may include one access point identifier (e.g., AP_ID1 210) and multiple access point configuration values (default firmware, Zigbee protocol, etc.). In some examples, the access point identifier may be randomly selected from the access point identifiers list and the access point configuration values may be randomly selected from one of the rules in the first rules list. For example, the processor 204 may select a first access point identifier 210 AP_ID1 from the access point identifiers list 216 and access point configuration values (e.g., default firmware, Zigbee protocol) from one of the rules in the first rules list. In other examples, the access point identifiers and the access point configuration values may be selected arbitrarily from the network. For instance, the processor 204 may receive a complete list of access point identifiers and access point configurations used in the network. Based on the complete list, the processor 204 may randomly select a combination of access point identifier and access point configuration values.

At block 504, the processor 204 may compute an objective function value for the first combination to determine whether the first combination satisfies a rule in the first rules list. For example, the processor provides the first combination (AP_ID1 with default firmware and Zigbee protocol) and the rules list as input to an objective function for computing the objective function value. The first combination satisfies a rule in instances where the access point identifier satisfies a constraint indicated in the rule and the access point configuration values match the access point configuration values indicated in that rule. In instances where the combination satisfies a rule, the objective function value may increase (e.g., to a predefined value).

At block 506, the processor 204 may determine whether the objective function value matches a predefined objective function value. In some examples, the predefined objective function value may be a predefined maximum or minimum objective function value. The predefined objective function value may indicate that a given input combination (AP_ID1 with default firmware and Zigbee protocol) satisfies a rule, for example. In instances where the objective function does not match the predefined maximum or minimum value and indicates a penalty value of the rule, the processor 204 may determine that the given combination does not satisfy the rule. In some examples, the processor 204 may execute an optimization algorithm to vary the input (i.e., provide a different combination of access point identifier and access point configuration values) to the objective function. The processor may determine the objective function value for each of the different combinations provided as input. For instance, the processor 204 may perform the method blocks 502-506 iteratively to select new combinations of the access point identifier and access point configuration values.

At block 508, the processor 204 may select the access point 106A associated with access point identifier AP_ID1 in response to the objective function value for a given input combination matching with the predefined objective function value. Further, at block 510, the processor 204 may configure the access point 106A with the access point configuration values, i.e., default firmware and Zigbee protocol.

Figure 6A:
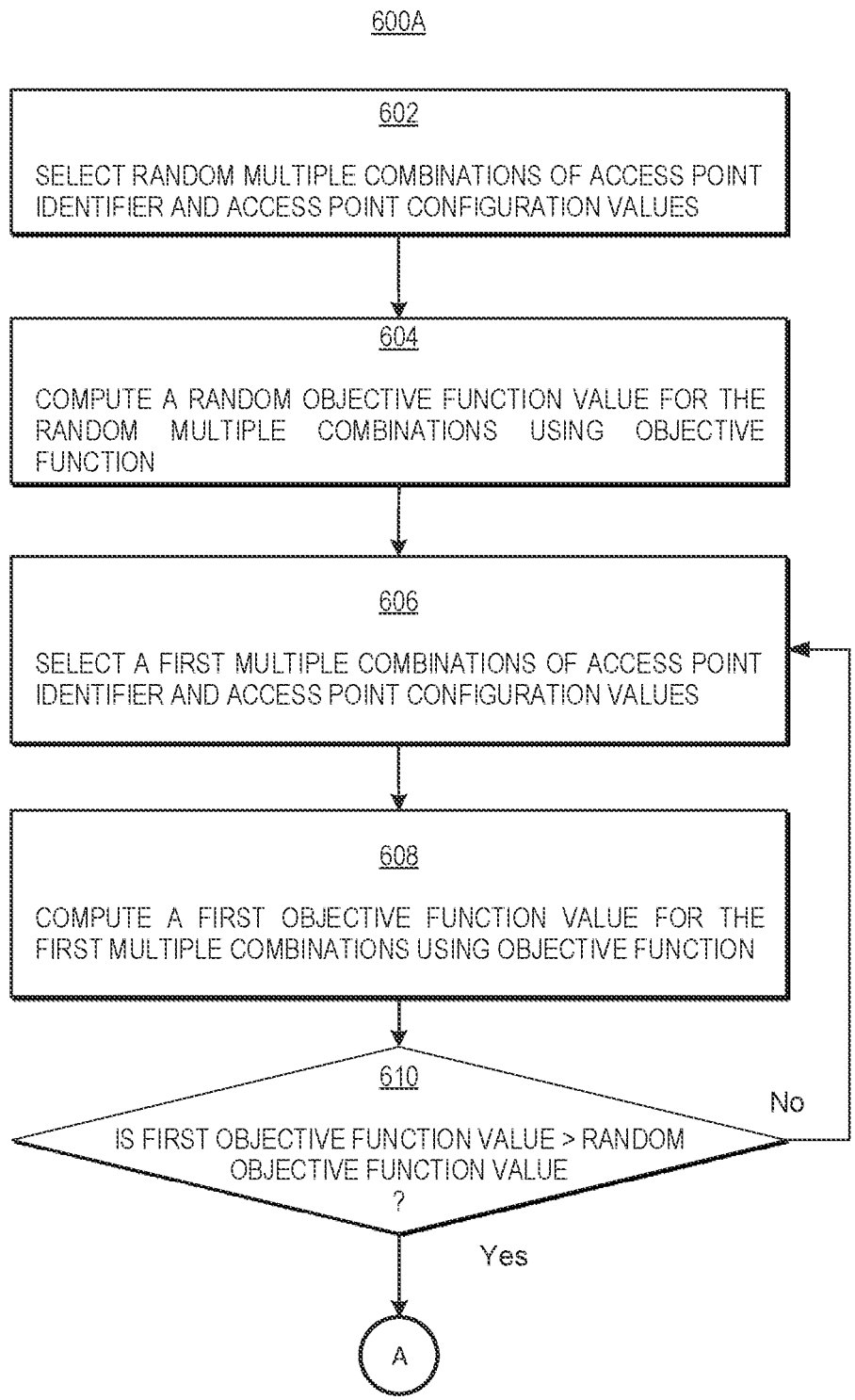
FIGS. 6A and 6B are flow diagrams depicting a method for selecting multiple access points for configuration, in accordance with another example.
Figure 6B:
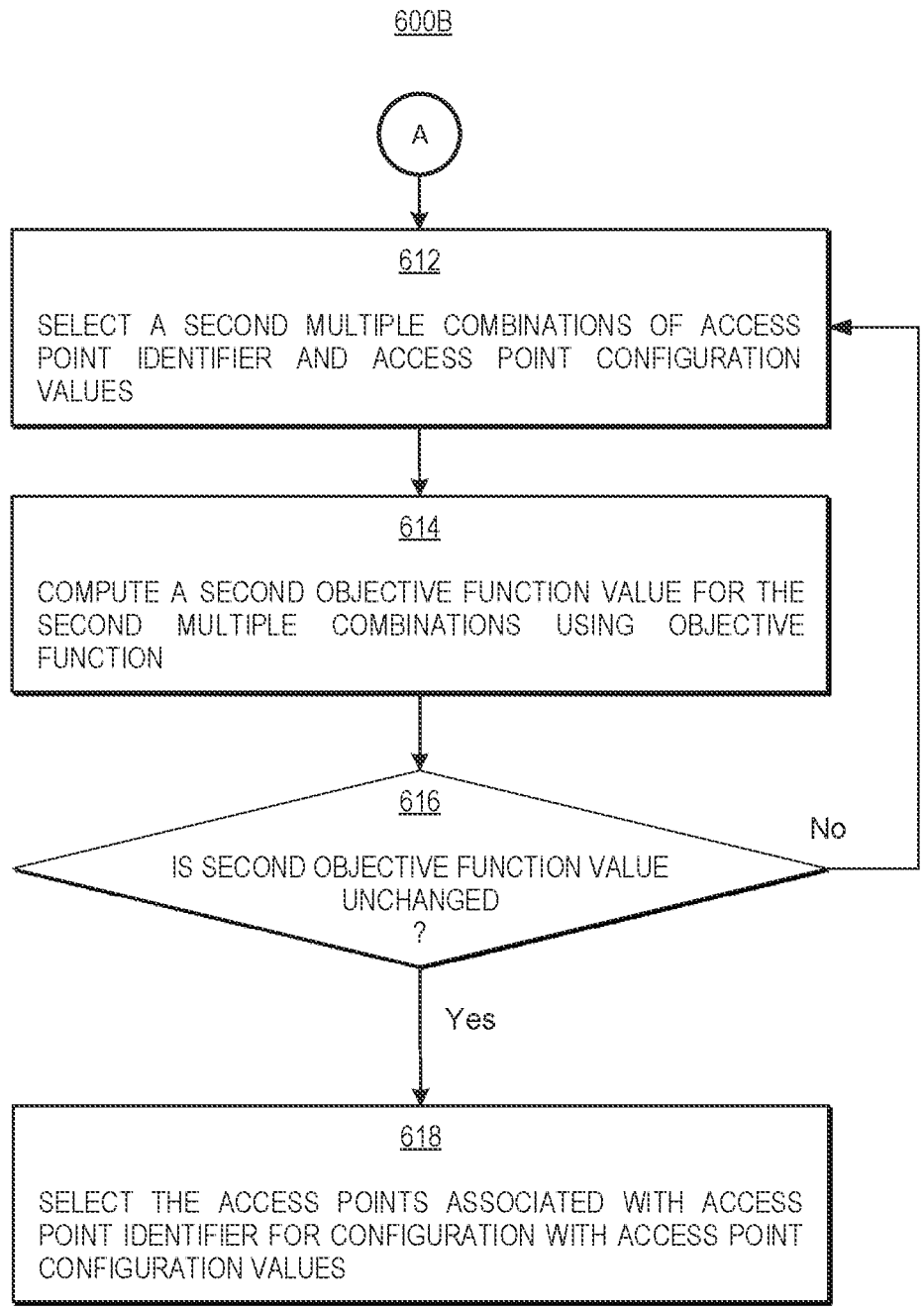

FIGS. 6A and 6B are flow diagrams depicting a method 600A-600B for identifying and selecting multiple access points for configuration, in accordance with another example. At block 602, the processor 204 may randomly select multiple combinations (referred to as random multiple combinations) of access point identifiers and access point configuration values. For example, the processor 204 may arbitrarily select multiple combinations of access point identifiers and the access point configuration values from the complete list of access point identifiers and configurations used in the network. The complete list of access point identifiers and configurations used in the network may be received from the network administration node 202, for example.

At block 604, the processor 204 may compute a random objective function value for the random multiple combinations using the objective function. For example, the random multiple combinations and a current configuration of the network may be provided as input to the objective function and the random objective function value may be the output. The random objective function value may be a measure of the number of access point identifiers correctly paired with a set of access point configuration values in the random multiple combinations. The correctness may be with respect to the current configuration of the access points in the network, for example. The current configuration data may be obtained from the complete list access points received from the network administration node 202. In some examples, the processor 204 may execute an optimization algorithm for improving the random objective function value, i.e., for increasing the number of correct combination of access point identifiers and access point configuration values. For example, the processor 204 may execute the steps 602 and 604 iteratively to vary the inputs (random multiple combinations) to the objective function and obtain an improved random objective function value.

At block 606, the processor 204 may select a first multiple combinations of access point identifiers and access point configuration values. The first multiple combinations of access point identifiers and access point configuration values may be distinct from the random multiple combinations selected at block 602. For instance, the first multiple combinations may include access point identifiers arbitrarily selected from the access point identifiers list and the access point configuration values arbitrarily selected from a rule in the first rules list 218. The first multiple combination of access point identifiers and access point configuration values and the rules list may be provided as input to the objective function.

At block 608, the processor 204 may compute a first objective function value for the first multiple combinations using the objective function. In some examples, the objective function used for determining random objective function value may different from the objective function for determining the first objective function values. The first objective function value may be a measure of the number of combinations satisfying one or more rules from the first rules list 218. Satisfying the rule may include determining whether the access point identifiers satisfy a constraint in the rule and the access point configuration values match with the access point configuration values indicated in the same rule. The first objective function value may increase based on the number of combinations satisfying the rule. For each combination that satisfies a rule, the first objective function value increases. In instances where a combination does not satisfy a rule, the first objective function value may decrease. The decrease in value may be based on a penalty value indicated in the rule, which was not satisfied, for example. The processor 204 may determine that a combination does not satisfy a given rule based on the penalty value.

At block 610, the processor 204 may determine whether the first objective function value is greater than the random objective function value. For instance, the processor 204 may compare the quality of the first multiple combinations with that of the random multiple combinations. The quality may be understood in terms of the correct combination of the access point identifiers and access point configuration values. In instances where the first objective function value is less than or equal to the random objective function value, the processor 204 may try to select improved first multiple combinations. For instance, the processor 204 may select a new first multiple combinations of access point identifiers and access point configuration values at block 606 in a next iteration of 606, 608, and 610. In instances where the first objective function value is greater than the random objective function value, the processor 204 may store the associated first multiple combination in a cache memory, for example. The stored first multiple combination is a more accurate combination of access point identifiers and access point configuration values compared to the random multiple combinations. The processor 204 may use the stored first multiple combinations as a baseline combination to identify other multiple combinations of access point identifiers and access point configuration values based on objective function values.

As shown in FIG. 6B, at block 612, the processor 204 may select a select a second multiple combinations of access point identifiers and access point configuration values. The second multiple combinations may be selected based on the baseline multiple combinations, such as the stored first multiple combinations. For example, the second multiple combinations may include one or more combinations from the first multiple combinations.

At block 614, the processor 204 may compute a second objective function value for the second multiple combinations using the objective function. The second objective function value may indicate an accuracy of the selected second multiple combinations. In other words, the second objective function value may be a measure of the number of combinations satisfying one or more rules from the first rules list 218. Satisfying the rule may include determining whether the access point identifiers satisfy a constraint in the rule and the access point configuration values match with the access point configuration values indicated in the same rule.

In some examples, the processor 204 may execute an optimization algorithm for improving the second objective function value, i.e., increasing the number of combinations satisfying a rule in the first rules list 218. For example, the processor 204 may execute the steps 612 and 614 iteratively to vary the inputs to the objective function and obtain an improved second objective function value. To check whether the second objective function value improves with respect to the previous iteration, the processor 204 may determine whether the second objective function value remains unchanged with respect to the previous iteration, at block 616. In instances where the second objective function value remains unchanged, the processor 204 may determine the that the highest number of combinations satisfying one or more rules in the first rules list 218 are obtained.

In instances where the second objective function value is less than or greater than the previous second objective function value, the processor 204 may select another multiple second combinations of access point identifiers and access point configuration values at block 612. The processor 204 may perform the blocks 612-616 iteratively until the second objective function value is the same as that computed in previous iteration. In some examples where the second objective function value is less than the previous second objective function value, the processor 204 may additionally compare the second objective function value and the first objective function value to determine whether the second multiple combinations is better than the baseline multiple combinations. In instances where the second objective function value is less than the first objective function value, the processor 204 may use the baseline multiple combinations (i.e., first multiple combinations) as the second multiple combinations and perform the blocks 612-616 again. The baseline multiple combination allows the processor 204 to drop a second multiple combinations in instances where the number of combinations are low in comparison to the baseline multiple combinations.

Further, in the example where the second objective function value remains unchanged with respect to previous iteration, i.e., the highest number of combinations satisfying one or more rules in the first rules list 218 are obtained, the processor 204 may store that second multiple combinations of access point identifiers and access point configuration values say in a cache memory. At block 618, the processor 204 may select the access points associated with the access point identifiers from the cache memory for configuration with access point configuration values.

As described herein, the example method 600A-600B allow configuration of multiple access points with access point configuration values in a site. The configuration of multiple access points may be performed with reduced manual intervention. For example, a network administrator (e.g., network administration node 202) may provide a set of rules (e.g., first rules list 218) and the access point identifiers 216, and the example method described herein may automatically select accurate combinations of access point identifiers and access point configuration values.

Figure 7:
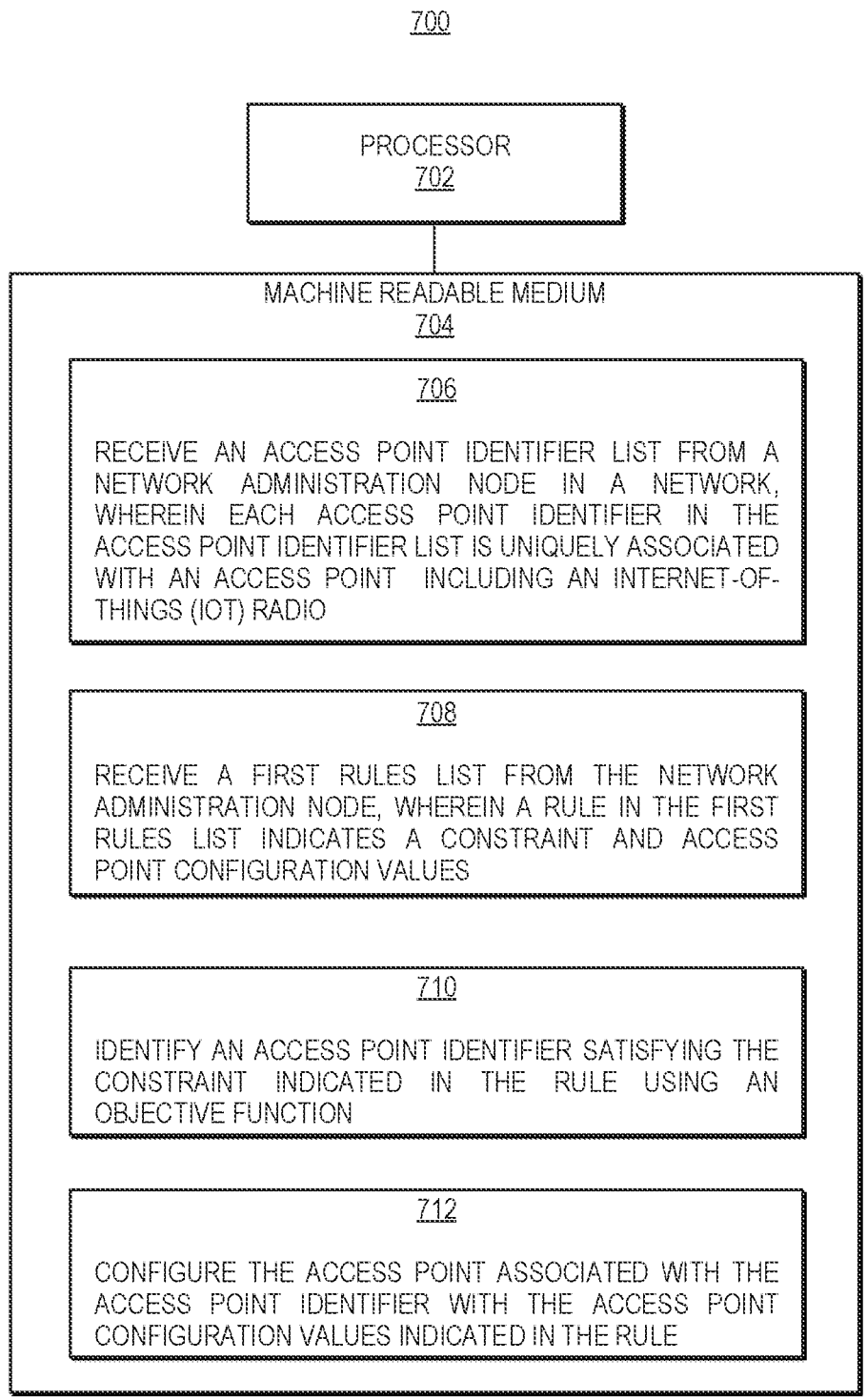
FIG. 7 is a block diagram depicting a processor and a machine-readable medium encoded with example instructions to configure access points including an IoT radio, in accordance with an example.

Moving to FIG. 7, a block diagram 700 depicting a processor 702 and a machine-readable medium 704 encoded with example instructions to facilitate reconfiguration of access points with IoT radio is presented, in accordance with an example. The machine-readable medium 704 may be non-transitory and is alternatively referred to as a non-transitory machine-readable medium 704. As described in detail herein, the machine-readable medium 704 may be encoded with executable instructions 706, 708, 710, and 712 (hereinafter collectively referred to as instructions 706-712) for performing the method 400 described in FIG. 4. Although not shown, in some examples, the machine-readable medium 704 may be encoded with certain additional executable instructions to perform the method 400 of FIG. 4, and/or any other operations performed by the management node 102, without limiting the scope of the present disclosure. In some examples, the machine-readable medium 704 may be accessed by the processor 702. In some examples, the processor 702 may represent one example of the processor 204 of the management node 102. Further, the machine-readable medium 704 may represent one example of the machine-readable medium 206 of the management node 102. In some examples, the processor 702 may fetch, decode, and execute the instructions 706-712 stored in the machine-readable medium 704 to perform reconfiguration of access points with IoT radio.

The instructions 706 when executed by the processor 702 may cause the processor 702 to receive an access point identifier list from a network administration node in a network. Each access point identifier in the access point identifier list may be uniquely associated with an access point device including an Internet-of-Things (IoT) radio. The instructions 708 when executed by the processor 702 may cause the processor 702 to receive a first rules list from the network administration node. Each rule in the first rules list may indicate a constraint and access point configuration values. Furthermore, the instructions 710 when executed by the processor 702 may cause the processor 702 to identify an access point identifier satisfying the constraint indicated in the rule using an objective function. Moreover, the instructions 712 when executed by the processor 702 may cause the processor 702 to configure the access point device associated with the access point identifier with the access point configuration values indicated in the rule.

While certain implementations have been shown and described above, various changes in form and details may be made. For example, some features and/or functions that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A method comprising:
receiving, by a processor, an access point identifier list from a network administration node in a network, wherein the access point identifier list comprises a plurality of access point identifiers, and wherein each access point identifier in the access point identifier list is uniquely associated with an access point including an Internet-of-Things (IoT) radio that is capable of supporting IoT protocols;
receiving, by the processor, a first rules list from the network administration node, wherein a rule in the first rules list indicates a constraint and an access point configuration value;
iteratively selecting, using an objective function, a new combination of an access point identifier from the access point identifier list and the access point configuration value until an objective function value is obtained from the objective function for the access point identifier that exceeds the constraint indicated in the rule;
identifying, by the processor, the access point identifier satisfying the constraint indicated in the rule using the objective function; and
configuring, by the processor, the access point associated with the access point identifier with the access point configuration value indicated in the rule.

2. The method of claim 1, wherein the iterative selection of the new combination of the access point identifier from the access point identifier list and the access point configuration value further comprises:
selecting, by the processor, a first combination of a second access point identifier from the access point identifier list and a second access point configuration value;
computing, by the processor, a second objective function value for the first combination of the second access point identifier and the second access point configuration value using the objective function;
determining, by the processor, whether the second objective function value matches a predefined objective function value; and
in response to a determination that the second objective function value matches the predefined objective function value, selecting, by the processor, the access point associated with the second access point identifier for configuration with the second access point configuration value.

3. The method of claim 2, further comprising:
in response to a determination that the second objective function value does not match the predefined objective function value, performing, by the processor, a next iteration of the selecting, the computing, and the determining.

4. The method of claim 1, further comprising:
identifying, by the processor, multiple access point identifiers satisfying the constraint indicated in the rule in the first rules list using the objective function.

5. The method of claim 4, further comprising:
selecting, by the processor, a combination of each access point identifier from the identified multiple access point identifiers with a respective access point configuration value from the first rules list;
computing, by the processor, an objective function value for each combination using the objective function; and
when respective objective function values for respective combinations are the same, selecting, by the processor, respective access points for configuration with same access point configuration values.

6. The method of claim 1, further comprising:
receiving, by the processor, a second rules list from the network administration node in the network, wherein each rule in the second rules list includes a second constraint and a second access point configuration value;
identifying, by the processor, an access point identifier satisfying the second constraint indicated in the rule in the second rules list using the objective function; and
configuring, by the processor, the access point with the second access point configuration value indicated in the rule in the second rules list.

7. The method of claim 1, wherein configuring the access point with the access point configuration value indicated in the rule comprises:
assigning, by the processor, the access point configuration value to the access point based on the rule; and
sending, by the processor, a configuration file to the access point, wherein the configuration file indicates the access point configuration value assigned to the access point.

8. The method of claim 1, wherein the access point identifier includes one or more of a location and a type of the access point.

9. The method of claim 1, wherein the access point configuration value include one or more of a firmware, a protocol, and a power specification.

10. The method of claim 1, wherein the constraint indicates an access point selection function including at least one of an access point location and an access point type.

11. A management node comprising:
a processor;
a machine-readable medium storing instructions that, when executed by the processor, cause the processor to:
receive an access point identifier list from a network administration node in a network, wherein the access point identifier list comprises a plurality of access point identifiers, and wherein each access point identifier in the access point identifier list is uniquely associated with an access point including an Internet-of-Things (IoT) radio that is capable of supporting IoT protocols;
receive a first rules list from the network administration node, wherein a rule in the first rules list indicates a constraint and access point configuration value;
iteratively select, using an objective function, a new combination of an access point identifier from the access point identifier list and the access point configuration value until an objective function value is obtained from the objective function for the access point identifier that exceeds the constraint indicated in the rule;
identify the access point identifier satisfying the constraint indicated in the rule using the objective function; and configure the access point associated with the access point identifier with the access point configuration value indicated in the rule.

12. The management node of claim 11, wherein the instructions further cause the processor to:
receive a second rules list from the network administration node in the network, wherein each rule in the second rules list includes a second constraint and a second access point configuration value;
identify a second access point identifier satisfying the second constraint indicated in the rule in the second rules list using the objective function; and
configure the access point with the second access point configuration value indicated in the rule in the second rules list.

13. The management node of claim 11, wherein the instructions further cause the processor to:
select a first combination of a second access point identifier from the access point identifier list and a second access point configuration value;
compute a second objective function value for the first combination of the second access point identifier and the second access point configuration value using the objective function;
determine whether the second objective function value matches a predefined objective function value; and
select the access point associated with the second access point identifier for configuration with the second access point configuration value, in response to the objective function value matching the predefined objective function value.

14. The management node of claim 11, wherein the instructions further cause the processor to:
identify multiple access point identifiers satisfying the constraint indicated in the rule in the first rules list using the objective function.

15. The management node of claim 14, wherein the instructions further cause the processor to:
select a combination of each access point identifier from the identified multiple access point identifiers with a respective access point configuration value from the first rules list;
compute an objective function value for each combination using the objective function; and
when respective objective function values for respective combinations are the same, select respective access points for configuration with same access point configuration values.

16. The management node of claim 11, wherein the access point configuration value includes a firmware, a protocol, and a power specification.

17. A non-transitory machine-readable medium storing instructions executable by a processor, the instructions comprising:
instructions to receive an access point identifier list from a network administration node in a network, wherein the access point identifier list comprises a plurality of access point identifiers, and wherein each access point identifier in the access point identifier list is uniquely associated with an access point including an Internet-of-Things (IoT) radio that is capable of supporting IoT protocols;
instructions to receive a first rules list from the network administration node, wherein a rule in the first rules list indicates a constraint and access point configuration value;

instructions to iteratively select, using an objective function, a new combination of an access point identifier from the access point identifier list and the access point configuration value until an objective function value is obtained from the objective function for the access point identifier that exceeds the constraint indicated in the rule;

instructions to identify the access point identifier satisfying the constraint indicated in the rule using the objective function; and instructions to configure the access point associated with the access point identifier with the access point configuration value indicated in the rule.

18. The non-transitory machine-readable medium of claim 17, wherein the instructions to iteratively select the new combination of the access point identifier from the access point identifier list and the access point configuration value further comprise instructions to:

select a first combination of a second access point identifier from the access point identifier list and a second access point configuration value;

compute a second objective function value for the first combination of the second access point identifier and the second access point configuration value using the objective function;

determine whether the objective function value matches a predefined objective function value; and select the access point associated with the second access point identifier for configuration with second access point configuration value, in response to the second objective function value matching the predefined objective function value.

19. The non-transitory machine-readable medium of claim 17, further comprising instructions to:

identify multiple access point identifiers satisfying the constraint indicated in the rule in the first rules list using the objective function.

20. The non-transitory machine-readable medium of claim 19, wherein the instructions to identify the multiple access point identifiers further comprise instructions to:

select a combination of each access point identifier from the identified multiple access point identifiers with a respective access point configuration value from the first rules list;

compute an objective function value for each combination using the objective function; and when respective objective function values for respective combinations are the same, select respective access points for configuration with same access point configuration values.

\* \* \* \* \*